(12) United States Patent
Nakano

(10) Patent No.: US 10,474,856 B2
(45) Date of Patent: Nov. 12, 2019

(54) READER DEVICE AND CONTROL METHOD OF READER DEVICE

(71) Applicant: OMRON Corporation, Kyoto (JP)

(72) Inventor: Yoshimitsu Nakano, Ritto (JP)

(73) Assignee: OMRON Corporation, Kyoto (JP)

( * ) Notice: Subject to any disclaimer, the term of this patent is extended or adjusted under 35 U.S.C. 154(b) by 30 days.

(21) Appl. No.: 15/844,634

(22) Filed: Dec. 18, 2017

(65) Prior Publication Data

US 2018/0260591 A1 Sep. 13, 2018

(30) Foreign Application Priority Data

Mar. 7, 2017 (JP) .................. 2017-043260

(51) Int. Cl.
*G06K 7/10* (2006.01)
*G08B 7/06* (2006.01)

(52) U.S. Cl.
CPC .......... *G06K 7/10366* (2013.01); *G08B 7/06* (2013.01)

(58) Field of Classification Search
None
See application file for complete search history.

(56) References Cited

U.S. PATENT DOCUMENTS

| 2004/0232224 A1* | 11/2004 | Beenau .................. G06Q 20/00 235/380 |
| 2012/0075072 A1* | 3/2012 | Pappu .................. H04B 5/0037 340/10.1 |
| 2015/0053763 A1* | 2/2015 | Sun .................... G06K 19/0723 235/439 |

FOREIGN PATENT DOCUMENTS

| JP | 2010246160 | 10/2010 |
| JP | 2011001132 | 1/2011 |
| JP | 2013037663 | 2/2013 |

* cited by examiner

*Primary Examiner* — Kristy A Haupt
(74) *Attorney, Agent, or Firm* — JCIPRNET

(57) ABSTRACT

An operator is enabled to perform an installation test efficiently. A reader device includes an ID determining unit that specifies an ID code of an RFID tag which is an interaction partner when an interaction with the RFID tag succeeds and an output control unit that causes an LED to emit light in different colors when the ID code is the same as an ID code determined in a previous interaction or an ID code stored in advance in a storage unit and when the ID code is different from the ID code determined in a previous interaction or the ID code stored in advance in the storage unit.

19 Claims, 8 Drawing Sheets

READER DEVICE AND CONTROL METHOD OF READER DEVICE

CROSS-REFERENCE TO RELATED APPLICATION

This application claims the priority benefit of Japanese Patent Application Laid-Open (JP-A) no. 2017-043260, filed on Mar. 7, 2017. The entirety of each of the above-mentioned patent applications is hereby incorporated by reference herein and made a part of this specification.

BACKGROUND

Technical Field

The disclosure relates to a reader device that interacts with an radio frequency identification (RFID) tag using RFID technology, and the like.

Description of Related Art

Recently, a radio frequency identification (RFID) system using an ultrahigh frequency (UHD) band as a communication band has been developed. In an RFID system using a UHF band, an interaction distance between a reader/writer and an RFID tag is about several meters which is longer than that in an RFID system in the related art.

Accordingly, in an RFID system using a UHF band, the reader/writer may erroneously read a tag other than an RFID tag (a target RFID tag) which an operator wants to read. For example, in production control in a factory, when RFID tags are attached to products and are read using a reader/writer, the reader/writer may erroneously read an RFID tag in a neighboring production line.

Various techniques have been developed to cope with a case in which an unwanted RFID tag is read. For example, Patent Documents 1 and 2 disclose techniques for detecting the reading of an unwanted RFID tag on the basis of a reception level from an RFID tag and not notifying an operator about the reading of the unwanted RFID tag.

[Patent Document 1] Japanese Unexamined Patent Application Publication No. 2011-001132 (published Jan. 6, 2011)

[Patent Document 2] Japanese Unexamined Patent Application Publication No. 2013-037663 (published Feb. 21, 2013)

[Patent Document 3] Japanese Unexamined Patent Application Publication No. 2010-246160 (published Oct. 28, 2010)

In order to prevent reading of an unwanted RFID tag, it is necessary to perform a test operation (installation test) for adjusting a positional relationship between a reader/writer and an RFID tag and to appropriately set a positional relationship between the reader/writer and a target RFID tag in the installation test.

In the installation test, generally, an interaction is caused in a state in which a reader/writer is connected to a personal computer (PC) and an operator performs positioning of the reader/writer while monitoring a reception level and an ID code of an RFID tag using the PC.

However, at a site at which a reader/writer is actually installed, since the places at which the reader/writer and an RFID tag are installed are often separated from a place at which the PC is installed, an operator needs to repeatedly perform position adjustment of the reader/writer and the RFID tag and monitoring with the PC while moving back and forth between the installation places. Accordingly, there is a problem of the efficiency of the installation test being poor and the time taken for the test. There is also a problem in that an operator cannot simultaneously perform monitoring and position adjustment. For example, when an operator is performing the position adjustment of the reader/writer and the RFID tag, the operator may not be able to see that the reader/writer is interacting with an unwanted RFID tag. It is also difficult for an operator to finely adjust positions of the reader/writer and the RFID tag while observing an interaction state.

An embodiment of the invention is made in consideration of the above-mentioned problems and an embodiment thereof is to provide a reader device that allows an operator to efficiently perform an installation test, and the like.

SUMMARY

According to an embodiment of the disclosure, there is provided a reader device including: an interaction unit configured to interact with an radio frequency identification (RFID) tag at predetermined time intervals using RFID technology; an output unit; an identification determining unit configured to determine an identification of the RFID tag which is an interaction partner when the interaction succeeds; and an output control unit configured to cause the output unit to perform different outputs when the identification determined by the identification determining unit is the same as a predetermined identification and when the identification determined by the identification determining unit is different from the predetermined identification.

According to another embodiment of the disclosure, there is provided a control method of a reader device including an interaction unit configured to perform an interaction with an radio frequency identification (RFID) tag at predetermined time intervals using RFID technology and an output unit. The control method includes: an identification determining step of determining an identification of the RFID tag which is an interaction partner when the interaction succeeds; and an output control step of causing the output unit to perform different outputs when the identification determined in the identification determining step is the same as a predetermined identification and when the identification determined in the identification determining step is different from the predetermined identification.

DESCRIPTION OF THE EMBODIMENTS

Figure 1:
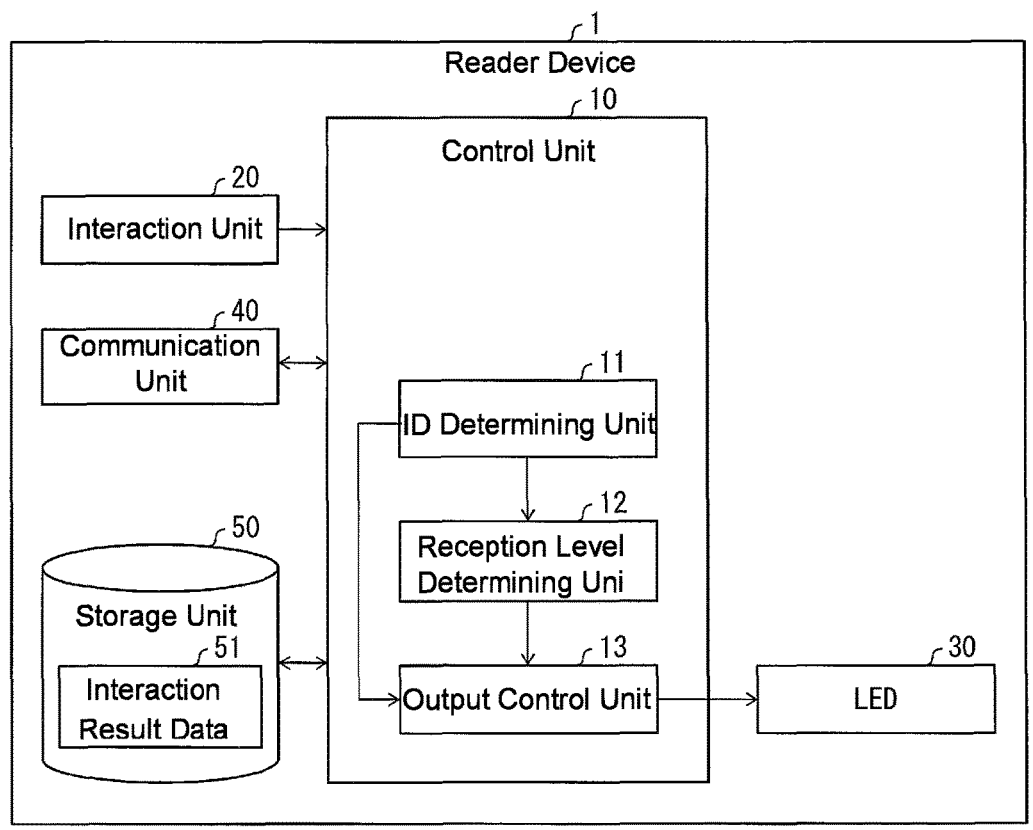
FIG. 1 is a block diagram illustrating a configuration of a principal part of a reader device according to a first embodiment of the disclosure.

According to this configuration of the embodiment of the disclosure, the reader device identifies whether the RFID tag which is an interaction partner is the same as the predetermined RFID tag when the interaction succeeds. Even when the interaction succeeds, the reader device performs different outputs depending on whether the reader device interacts with the same RFID tag as the predetermined RFID tag or whether the reader device interacts with another RFID tag. Accordingly, an operator can determine whether the reader device has interacted with a target RFID tag based on the output of the output unit of the reader device.

In other words, an operator can obtain information required for a test (an installation test) for determining an installation position of the reader device without monitoring interactions of the reader device using an external device or the like. That is, since an operator can perform an installation test while observing the reader device and the RFID tag, it is possible to efficiently perform an installation test.

The predetermined identification may be an identification which has been previously determined by the identification determining unit.

According to this configuration, even when the interaction succeeds, the reader device performs different outputs when the reader device interacts with the same RFID tag as an RFID tag previously interacting therewith and when the reader device interacts with another RFID tag. Accordingly, an operator can determine whether the reader device is stably interacting with the same RFID tag based on the output of the output unit of the reader device.

The reader device may further include a storage unit configured to store information indicating the predetermined identification in advance.

According to this configuration, even when the interaction succeeds, the reader device performs different outputs when the reader device interacts with the same RFID tag as an RFID tag (that is, a target RFID tag) having an identification stored in advance in the storage unit and when the reader device interacts with another RFID tag. Accordingly, an operator can determine whether the reader device is stably interacting with the target RFID tag based on the output of the output unit of the reader device.

The output unit may include one or more indication lamps, and the output control unit may cause the one or more indication lamps to emit light in different colors when the identification determined by the identification determining unit is the same as the predetermined identification and when the identification determined by the identification determining unit is different from the predetermined identification.

According to this configuration, an operator can visually determine whether the reader device is stably interacting with a target RFID tag. Accordingly, the operator can efficiently perform an installation test.

The output control unit may cause the one or more indication lamps to emit light in a color corresponding to the identification.

According to this configuration, an operator can recognize an RFID tag with which the reader device interacts based on the color of the one or more indication lamps. Accordingly, the operator can more efficiently perform an installation test of the reader device.

The reader device may further include a communication strength measuring unit configured to measure a communication strength of the interaction when the interaction succeeds, and the output control unit may cause the one or more indication lamps to blink at a blinking rate corresponding to the magnitude of the communication strength.

According to this configuration, an operator can recognize a communication strength between the reader device and the RFID tag based on a blinking rate of the one or more indication lamps. Accordingly, the operator can more accurately perform position adjustment of the reader device and the RFID tag based on the communication strength.

The output control unit may cause the one or more indication lamps to emit light in different colors when the communication strength is less than a predetermined threshold value and when the communication strength is equal to or greater than the predetermined threshold value.

The predetermined threshold value may be, for example, a value of a threshold at which communication between the reader device and the RFID tag can be stably performed. According to this configuration, an operator can recognize whether the reader device and the RFID tag stably communicate with each other based on a blinking color of the one or more indication lamps. Accordingly, the operator can more accurately perform position adjustment of the reader device and the RFID tag.

The output control unit may cause the one or more indication lamps to emit light at a blinking rate corresponding to an average value of the communication strengths in a predetermined number of immediately previous interactions in a period in which the identification determining unit specifies the same identification.

The communication strengths of the interactions may be uneven due to environmental factors around the reader device and the RFID tag. According to this configuration, the reader device determines a blinking rate of the one or more indication lamps based on a communication strength of which the unevenness in communication strength in the interactions is corrected. Accordingly, an operator can obtain more accurate information on the communication strength.

The output unit may include a sound output unit, and the output control unit may cause the sound output unit to output sound when the identification determined by the identification determining unit is different from the predetermined identification.

According to this configuration, when the reader device erroneously reads an unwanted RFID tag, the reader device can give a warming using sound. Accordingly, even if an operator is not watching the reader device, it is possible to notify the operator that an unwanted RFID tag has been read.

According to the embodiments of the disclosure, an operator can efficiently perform an installation test.

First Embodiment

Figure 2:
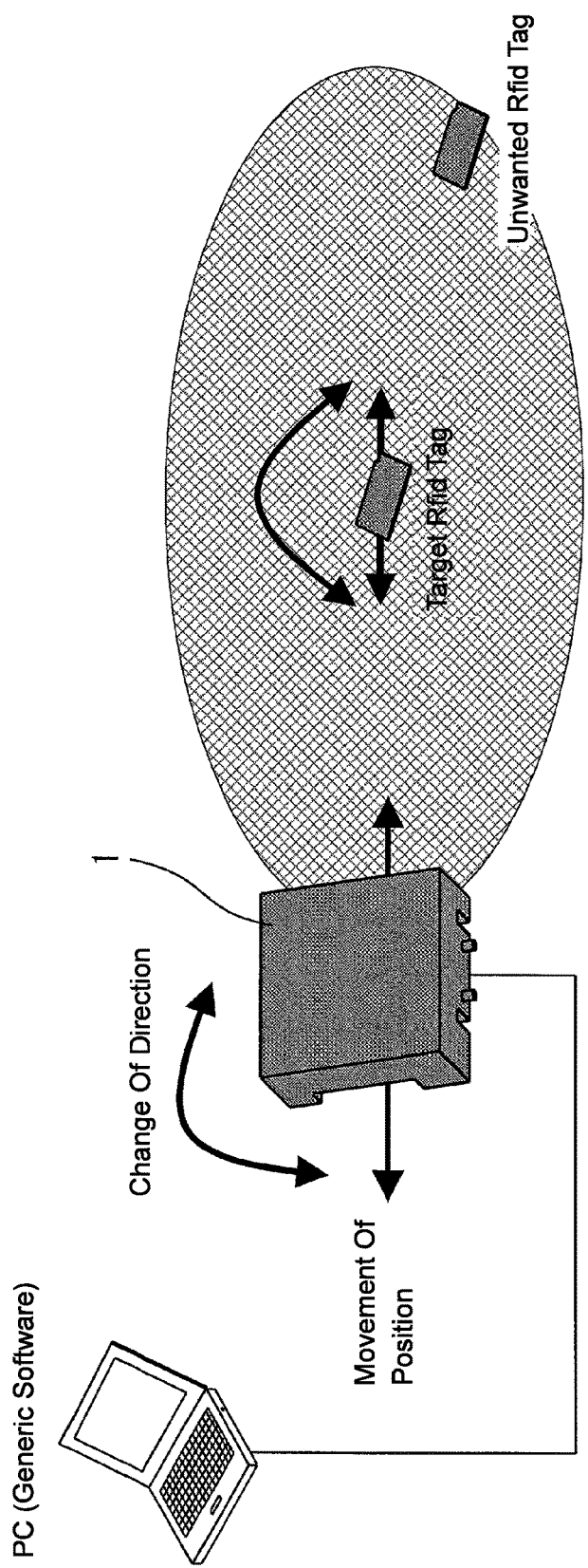
FIG. 2 is a diagram illustrating a method of performing an installation test of the reader device and an interaction of the reader device with an RFID tag.

Hereinafter, a first embodiment of the disclosure will be described in detail with reference to FIGS. 1 to 5, FIG. 6a and FIG. 6b. FIG. 2 is a diagram illustrating a method of performing an installation test of a reader device 1 and an interaction of the reader device 1 with an RFID tag.

<<Outline of installation test and reader device>> The reader device interacts with RFID tags which are present within a predetermined interaction range. In FIG. 2, an interaction range of the reader device 1 is indicated by a circle. In the other drawings, it is similarly assumed that an interaction range of the reader device 1 is indicated by a circle extending from the reader device 1. Specifically, the interaction range of the reader device 1 is appropriately determined to range from about several m to 10 m from the reader device 1.

A person (an operator) who performs an installation test first installs and starts the reader device 1. The reader device 1 may be connected to an external device such as a PC in the drawing, but connection to an external device is not essential. When the reader device 1 is started, the reader device 1 starts transmission of an interaction request. When an RFID tag is present within the interaction range, the reader device 1 can interact with at least one of the RFID tags in the interaction range. Specifically, when an RFID tag returns a response to the interaction request, the reader device 1 interacts with the RFID tag.

In FIG. 2, two RFID tags are present in the interaction range of the reader device 1. As illustrated in the drawing, one RFID tag is assumed to be a target RFID tag, and the other RFID tag is assumed to be an unwanted RFID tag. A "target RFID tag" refers to an RFID tag (or an RFID tag group which is hereinafter simply referred to as an RFID tag) which an operator wants to read using the reader device. On the other hand, an "unwanted RFID tag" refers to an RFID tag other than the target RFID tag. For example, for each production line in a factory, it is assumed that RFID tags are attached to products flowing in a production line and are to be read using the reader device. In this case, an RFID tag attached to a product in a production line is a target RFID tag and, for example, an RFID tag attached to a product in a neighboring production line is an unwanted RFID tag.

In the example illustrated in FIG. 2, the reader device 1 interacts with one RFID tag. In other words, an RFID tag which is an interaction partner may be changed for each interaction. When a plurality of RFID tags are present in the interaction range in this way, the reader device 1 according to the embodiment is characterized in that, when an RFID tag serving as an interaction partner changes, the reader device recognizes the change and notifies an operator thereof.

<<Configuration of principal parts>> A configuration of the reader device 1 will be described below. FIG. 1 is a circuit block diagram illustrating a configuration of principal parts of the reader device 1 according to this embodiment. The reader device 1 includes an interaction unit 20, a control unit 10, an LED (an indication lamp) 30 (output unit), a communication unit 40, and a storage unit 50.

The control unit 10 comprehensively controls the reader device 1. The control unit 10 includes an ID determining unit (an identification determining unit) 11, a reception level determining unit (a communication strength measuring unit) 12, and an output control unit 13. The control unit 10 determines whether an interaction succeeds after the interaction unit 20 transmits an interaction request once. Here, "an interaction succeeds" means that a response to the interaction request from the interaction unit 20 is returned from an RFID tag within a predetermined time. On the other hand, "an interaction fails" means that a response to the interaction request from the interaction unit 20 is not returned from any RFID tag. The control unit 10 may also determine that "an interaction fails," when a response is returned from an RFID tag but response data is not correct because of a cyclic redundancy code (CRC) error, a demodulation failure due to collision, or the like.

When the interaction succeeds, the ID determining unit 11 specifies an ID code of the RFID tag serving as an interaction partner of the interaction. Here, an ID code refers to an identification specific to each RFID tag. The ID determining unit 11 requests an RFID tag to transmit an ID code via the interaction unit 20 and causes the RFID tag to return an ID code. When the interaction unit 20 can interact with a plurality of RFID tags by one interaction, the ID determining unit 11 specifies the ID codes of all the RFID tags which have interacted therewith. The ID determining unit 11 transmits the determined ID codes to the output control unit 13.

The reception level determining unit 12 measures a reception level in the interaction of the interaction unit 20 with the RFID tag. Here, a reception level refers to a strength of radio waves (a communication strength) which are received by the interaction unit 20 and which is expressed, for example, by a received signal strength indicator (RSSI). The reception level determining unit 12 transmits the measured reception level to the output control unit 13.

The output control unit 13 controls emission of light (output) of the LED 30. The output control unit 13 determines an emission color and a blinking interval of the LED 30 and instructs the LED 30 to be turned on and off in the determined color at the determined blinking rate.

The control method of the LED 30 which is performed by the output control unit 13 will be described below in more detail. When an ID code is received from the ID determining unit 11, the output control unit 13 determines whether the received ID code is the same as an ID code which has been previously received (that is, an ID code of the RFID tag which is a previous interaction partner of the interaction unit 20). Then, the output control unit 13 causes the LED 30 to emit light in different colors depending on whether the received ID code is the same as the previous ID code or whether the received ID code is different from the previous ID code.

It is preferable that the output control unit 13 cause the LED 30 to emit light in different colors when the interaction succeeds and the received ID code is the same as the previous ID code, when the interaction succeeds and the received ID code is different from the previous ID code, and when the interaction fails. For example, it is preferable that the output control unit 13 cause the LED 30 to emit light in a color indicating a warning such as red, when the interaction fails.

Figure 3:
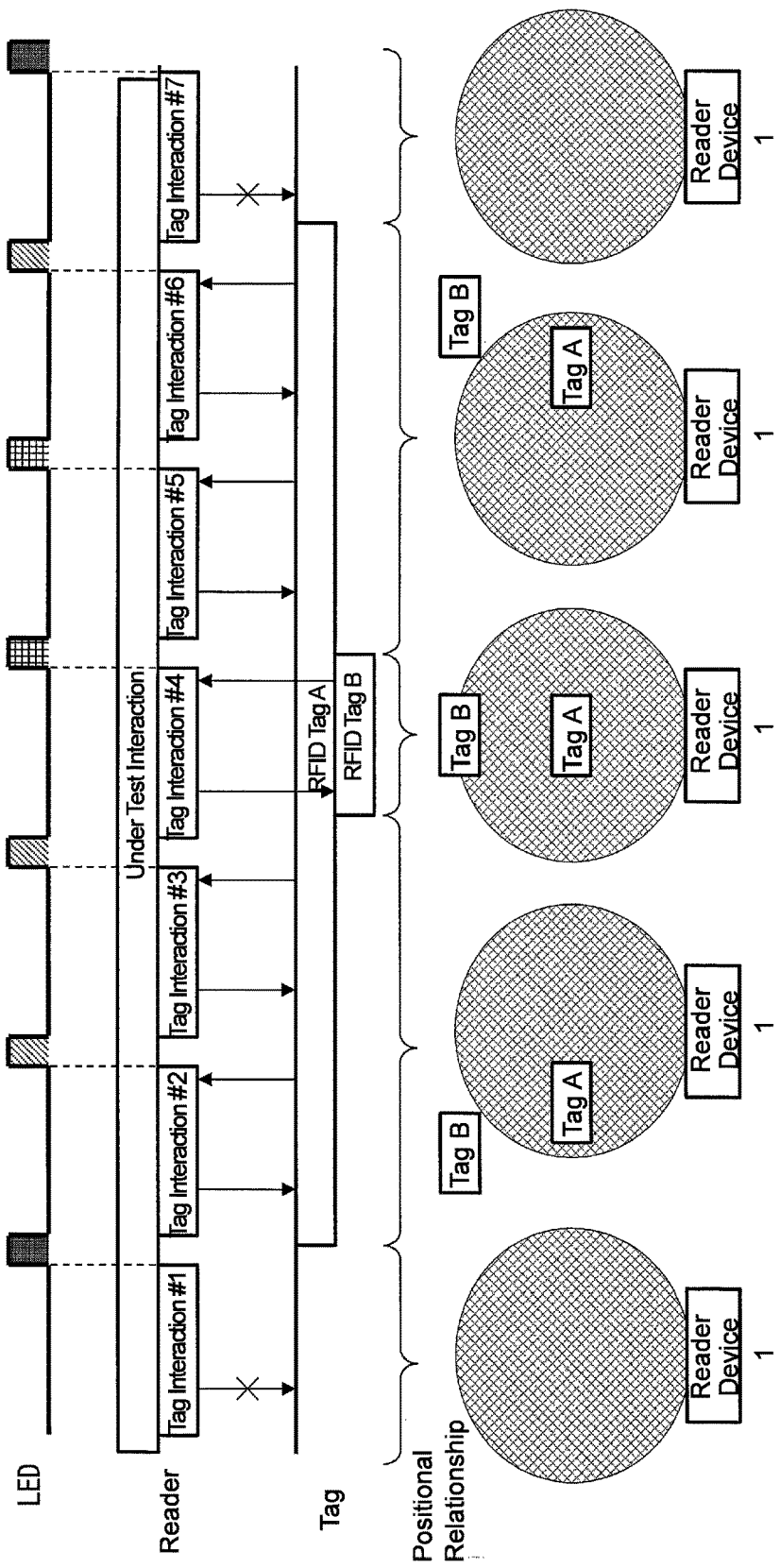
FIG. 3 is a diagram illustrating a relationship between whether an interaction of the reader device succeeds, a change of an RFID tag which is an interaction partner, and a change of an emission color of an LED (light emitting diode).

FIG. 3 is a diagram illustrating a relationship between whether an interaction of the reader device 1 succeeds, a change of the RFID tag which is an interaction partner, and a change of an emission color of the LED 30. In the drawing, a protruding portion in an "LED" row indicates emission of light from the LED 30, and a pattern of the protruding portion indicates an emission color of the LED 30. Different patterns indicate that the LED 30 emits light in different colors. Actually, instead of allowing the LED 30 to emit light once for each interaction, it is preferable that the LED 30 of the reader device 1 blink continuously or be turned on continuously.

A "reader" row denotes an interaction of the reader device 1. In the example illustrated in the drawing, the reader device 1 is under test transmission (a state in which an interaction request is transmitted from the interaction unit 20 in an installation test). Tag interactions #1 to #7 denote occurrence of each interaction.

A "tag" row denotes a period in which an RFID tag is present within the interaction range of the reader device 1. In FIG. 3, when the reader device 1 is under test transmission, RFID tag A and RFID tag B are present in the interaction range of the reader device 1 for a predetermined time. A "positional relationship" row denotes a positional relationship between the interaction range of the reader device 1 and RFID tag A and RFID tag B.

As illustrated in the drawing, RFID tag A is within the interaction range of the reader device 1 in time periods of Tag interactions #2 to #6, and RFID tag B is within the interaction range of the reader device 1 in a time period of Tag interaction #4. In times of Tag interactions #1 and #7, no RFID tag is within the interaction range of the reader device 1 and the interaction of the reader device 1 fails.

In the example illustrated in the drawing, the RFID tag as an interaction partner is switched from RFID tag A to RFID tag B between Tag interactions #3 and #4. When the RFID tag as an interaction partner is switched, the ID code determined by the ID determining unit 11 changes. Accordingly, for example, since the ID code (the ID code of RFID tag B) received at the time of Tag interaction #4 is different from the previous ID code (the ID code of RFID tag A), the output control unit 13 causes the LED 30 to emit light in an emission color (a color which is different from the emission color in Tag interactions #2 and #3) indicating tag switching.

Similarly, since the ID code (the ID code of RFID tag A) received at the time of Tag interaction #5 is different from the previous ID code (the ID code of RFID tag B), the output control unit 13 causes the LED 30 to emit light in an emission color indicating tag switching.

Figure 4:
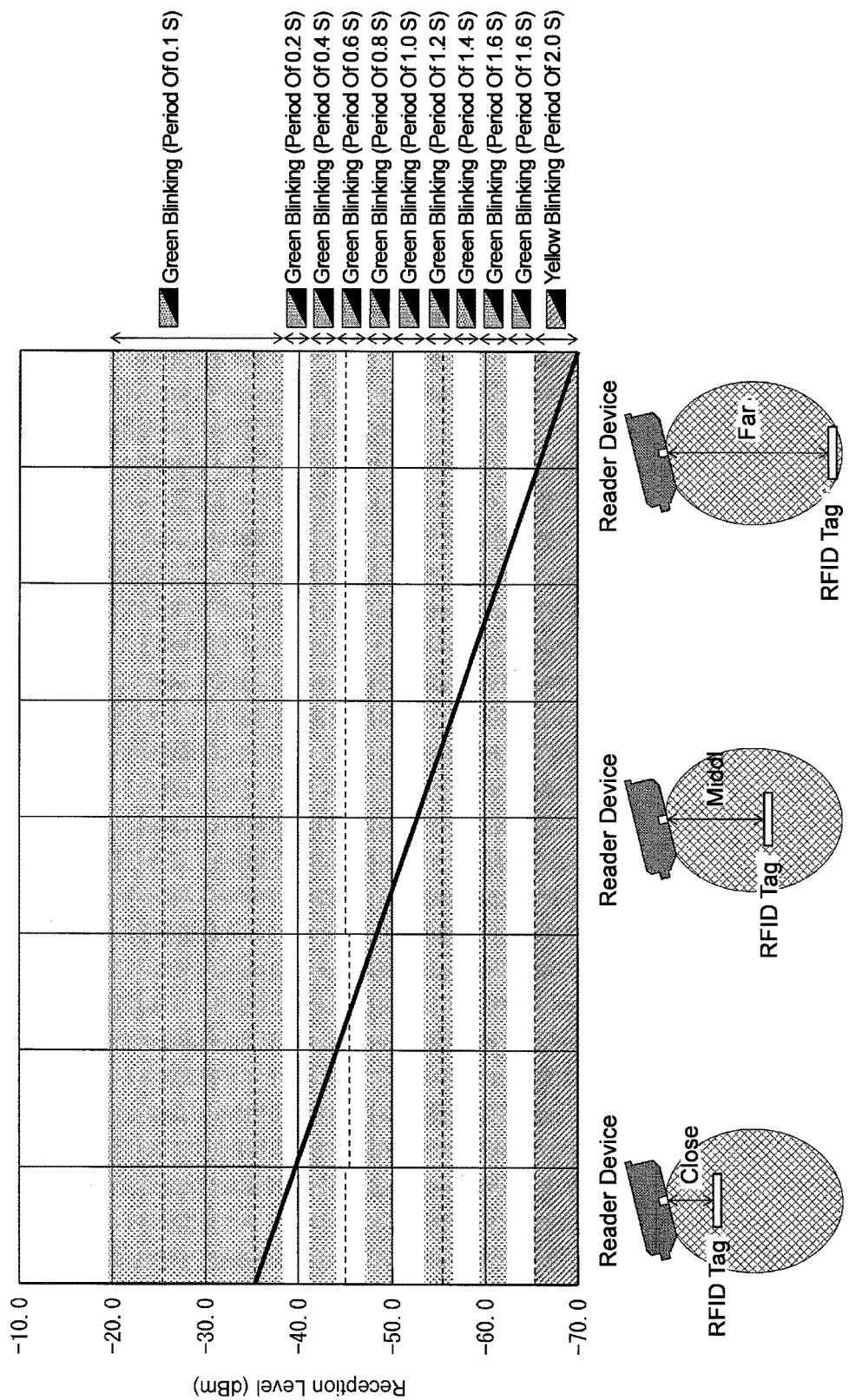
FIG. 4 is a graph illustrating an example of a relationship between a change of a reception level in an interaction of the reader device with an RFID tag and a blinking rate of an LED.

The output control unit 13 may determine a blinking rate (that is, a blinking period or the number of times of blinking per unit time) of the LED 30 depending on the reception level notified from the reception level determining unit 12 and may cause the LED 30 to blink at the determined rate. FIG. 4 is a graph illustrating an example of a relationship between a change of the reception level in an interaction of the reader device 1 with an RFID tag and the blinking rate of the LED 30. In the graph, the vertical axis represents the reception level and the horizontal axis represents the elapse of time.

The reception level of the reader device 1 depends on a distance from an RFID tag as an interaction partner. As illustrated in the drawing, the reception level decreases as the distance between the reader device 1 and the RFID tag increases, and the interaction fails when the RFID tag gets more distant and departs from the interaction range of the reader device 1.

When the RFID tag gets more distant gradually from the reader device 1 as illustrated in the drawing, the reception level decreases gradually as indicated by a solid line in the graph. When the reception level received from the reception level determining unit 12 is higher than an upper limit value, the output control unit 13 sets the blinking rate (a blinking period) to a highest rate. For example, when the reception level is equal to or higher than −37.5 dBm as illustrated in the drawing, the output control unit 13 sets the blinking rate of the LED 30 to a period of 0.1 s which is the highest rate. The output control unit 13 determines the blinking rate such that the blinking rate (the blinking period) of the LED 30 decreases as the reception level approaches a predetermined threshold value (which will be described later), and controls the LED 30.

Accordingly, an operator can recognize the communication strength between the reader device 1 and the RFID tag from the blinking rate of the LED 30. Accordingly, the operator can more accurately perform position adjustment of the reader device 1 and the RFID tag depending on the communication strength.

Depending on whether the reception level received from the reception level determining unit 12 is lower than a predetermined threshold value or whether the reception level is equal to or higher than the predetermined threshold value, the output control unit 13 may change the emission color of the LED 30. The predetermined threshold value is, for example, a value of a threshold at which communication between the reader device and an RFID tag can be stably performed. In the example illustrated in FIG. 4, when the reception level is lower than −65.0 dBm, the output control unit 13 causes the LED 30 to blink in yellow. On the other hand, when the reception level is equal to or higher than −65.0 dBm, the output control unit 13 causes the LED 30 to blink in green. Accordingly, an operator can recognize whether the reader device 1 and the RFID tag are stably communicating with each other from the blinking color of the LED 30. Accordingly, the operator can more accurately perform position adjustment of the reader device 1 and the RFID tag in the installation test.

When the ID code has not changed, the output control unit 13 may calculate an average value of the reception levels in the predetermined number of previous interactions and cause the indication lamp to emit light at a blinking rate corresponding to the average value. In the interaction of the reader device 1, the reception level may be uneven due to environmental factors around the reader device 1 and the RFID tag. Accordingly, by determining the blinking rate of the LED 30 using the average value of the reception levels in the predetermined interactions in this way, it is possible to cause the LED 30 to blink on the basis of a more accurate reception level. Accordingly, an operator can acquire more accurate information on the communication strength by observing the LED 30.

The interaction unit 20 interacts with an RFID tag using RFID technology. The interaction unit 20 transmits an interaction request at predetermined time interval in accordance with an instruction from the control unit 10. When an RFID tag is present within an interaction range of the interaction unit 20, the interaction unit 20 interacts with the RFID tag. When the interaction succeeds, the interaction unit 20 receives an ID code of the RFID tag from the RFID tag which is the interaction partner.

The LED 30 is turned on in a color and at time intervals instructed by the output control unit 13. It is preferable that a plurality of LEDs 30 be provided in the reader device 1. For example, when the reader device 1 has a rectangular parallelepiped shape, the LED 30 can be provided on each of four faces which are substantially perpendicular to an installation surface on which the reader device 1 is installed.

The communication unit 40 performs communication between the reader device 1 and an external device in accordance with an instruction from the control unit 10. The external device is, for example, a personal computer (PC). For example, the communication unit 40 may transmit interaction result data 51, which will be described later, to a PC that monitors the reader device 1 or has host software for collecting and managing a variety of data installed therein.

The storage unit 50 stores a variety of data required for operation of the reader device 1. The storage unit 50 stores, for example, the interaction result data 51. The interaction result data 51 is data including interaction results of the reader device 1. The interaction result data 51 is, for example, data in which whether an interaction succeeds for each interaction and an ID code of an RFID tag as an interaction partner when the interaction succeeds are recorded in correlation with each other. When the reception level determining unit 12 measures a reception level and the interaction succeeds, the interaction result data 51 may include the reception level of the interaction.

Figure 5:
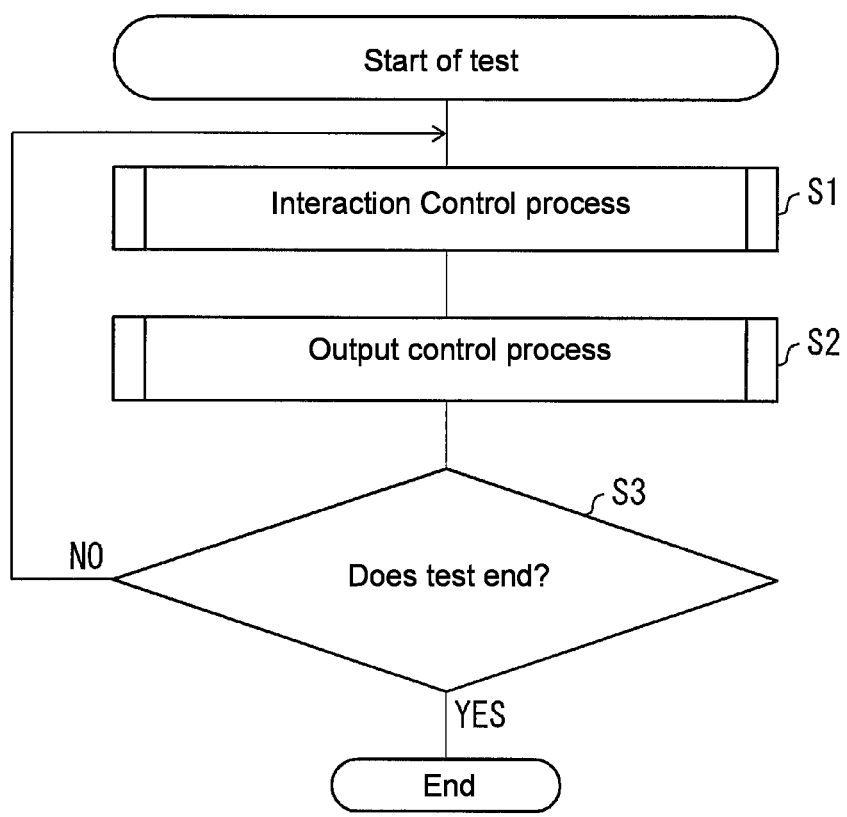
FIG. 5 is a diagram illustrating a process flow which is performed by the reader device in an installation test.

<<Process flow>> FIG. 5 is a flowchart illustrating a process flow which is performed by the reader device 1 in an installation test. When the reader device 1 is started, the reader device 1 performs an interaction control process (S1) associated with an interaction with an RFID tag. Then, the reader device 1 performs an output control process (S2, an output control step) of controlling an output of the LED 30 on the basis of information acquired through the interaction control process (S1). The reader device 1 repeatedly performs the interaction control process and the output control process (NO in S3), until an installation test ends (YES in S3).

Figures 6A, 6B:
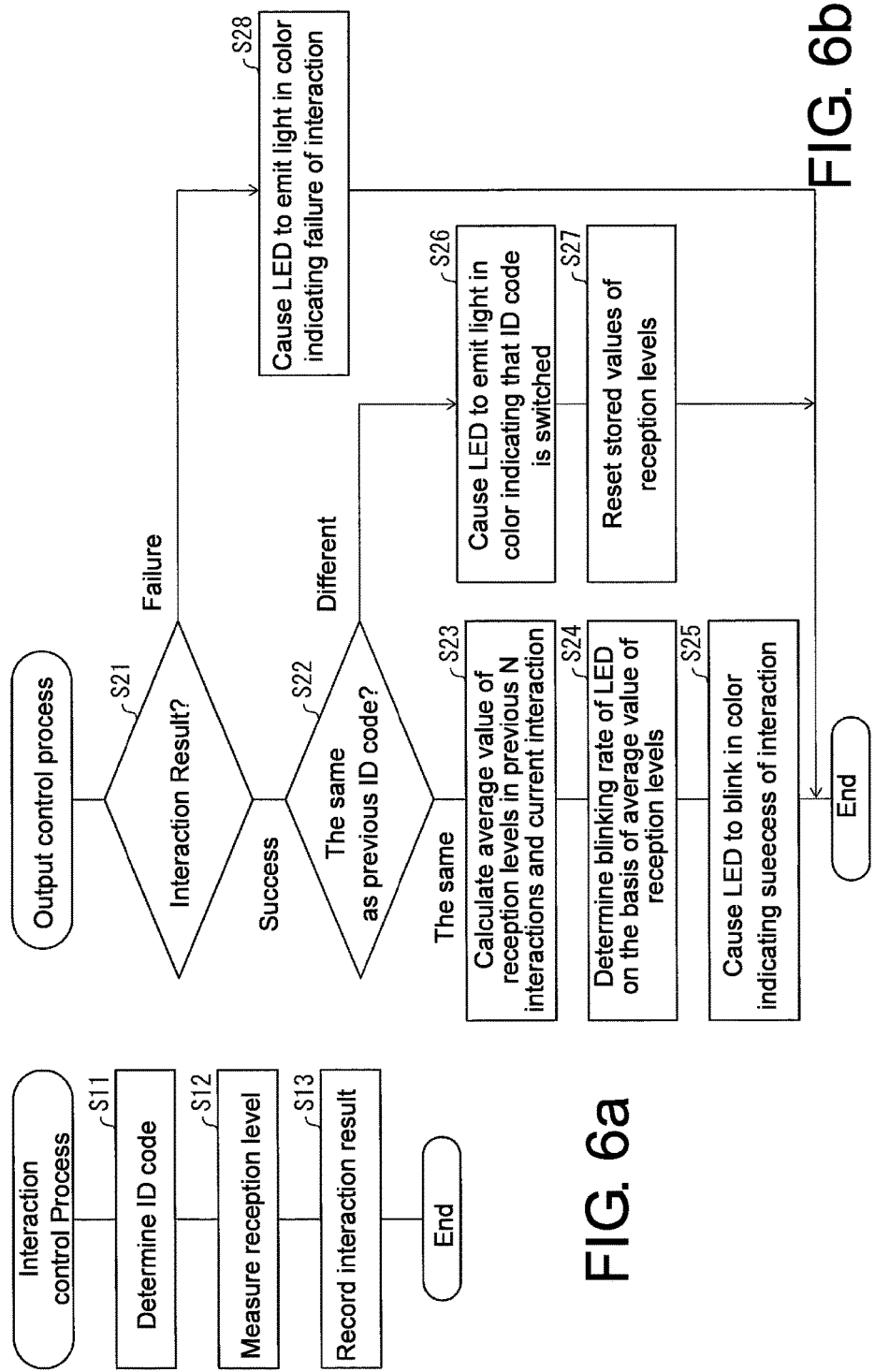
FIG. 6a is a diagram illustrating a process flow of an interaction control process.
FIG. 6b is a diagram illustrating a process of an output control process.

FIG. 6a illustrates a detailed process flow of the interaction control process. In the interaction control process, the control unit 10 first instructs the interaction unit 20 to transmit an interaction request. The interaction unit 20 transmits an interaction request, and interacts with an RFID tag when the RFID tag is present within the interaction range thereof. The interaction unit 20 sends information acquired through the interaction to the control unit 10. The ID determining unit 11 of the control unit 10 specifies an ID code of the RFID tag as the interaction partner (S11, an identification determining step), and the reception level determining unit 12 measures the reception level of the reader device 1 (S12). The processing order of S11 and S12 is random. When the interaction unit 20 cannot interact with the RFID tag in a predetermined time, the processes of S11 and S12 do not have to be performed.

The control unit 10 records the interaction results (S13) after performing the processes of S11 and S12. Specifically, the control unit 10 records whether the interaction succeeds and the ID code of the RFID tag which is the interaction partner and the reception level when the interaction succeeds in the interaction result data 51 of the storage unit 50.

FIG. 6b illustrates a process flow of the output control process which is performed by the output control unit 13. When the interaction succeeds ("success" in S21) and the ID code received from the ID determining unit 11 is the same as the ID code received in the previous interaction ("the same" in S22), the output control unit 13 calculates an average value of the reception level received from the reception level determining unit 12 and the reception levels in the previous N (where N is a predetermined natural number) interactions with the RFID tag with the same ID code (S23). The output control unit 13 determines a blinking rate of the LED 30 on the basis of the average value (S24). Finally, the output control unit 13 causes the LED 30 to blink in an emission color indicating the success of interaction at the blinking rate determined in S24 (S25).

On the other hand, when the interaction fails ("failure" in S21), the output control unit 13 may cause the LED 30 to emit light (or blink) in an emission color indicating the failure of interaction (S28). When the interaction succeeds but the ID code received from the ID determining unit 11 is different from the previous one ("different" in S22), the output control unit 13 causes the LED 30 to emit light (or blink) in an emission color indicating that the ID code is changed (S26). The emission color in S26 is different from at least the emission color in S25. The output control unit 13 resets the values of the reception levels stored to calculate the average value in S23 (S27).

According to the above-mentioned processes, the reader device 1 identifies whether the RFID tag which is the interaction partner is the same as the RFID tag previously interacting therewith. When the reader device 1 has interacted with the same RFID tag as the RFID tag previously interacting therewith and when the reader device 1 has interacted with another RFID tag, the reader device 1 causes the LED 30 to emit light in different emission colors. Accordingly, an operator can determine whether the reader device 1 is stably interacting with the target RFID tag on the basis of the color of the LED 30.

In other words, an operator can visually confirm information required for the installation test of the reader device 1 without monitoring the interaction of the reader device using an external device or the like. That is, since the operator can perform the installation test while observing the reader device 1 and the RFID tag, it is possible to efficiently perform the installation test.

According to the above-mentioned processes, an operator can recognize the reception level of the reader device 1 on the basis of the blinking rate of the LED 30. Accordingly, the operator can more accurately perform position adjustment of the reader device 1 and the RFID tag depending on the reception level.

The reception levels in the interactions may be uneven due to environmental factors around the reader device 1 and the RFID tag. However, according to the above-mentioned processes, since the reader device 1 determines the blinking rate of the LED 30 by correcting (averaging) the unevenness of the reception level, an operator can acquire more accurate information on the reception level.

In this embodiment, the reader device 1 notifies a user whether an interaction succeeds and whether an RFID tag which is an interaction partner is the same as in the previous interaction using the emission color of the LED 30. However, so long as the reader device 1 can perform at least different outputs depending on at least whether the RFID tag which is the interaction partner is the same as in the previous interaction, the output form thereof is not limited.

For example, the reader device 1 may include a speaker or a display in addition to the LED 30 or instead of the LED 30. When the reader device includes a speaker, the control unit 10 may include a block that controls the speaker instead of the output control unit 13, determine output details (such as details of an output sound and a sound volume) using the same criterion as in the output control unit 13, and control a sound output of the speaker. When the reader device includes a display, the control unit 10 may include a block that controls the display instead of the output control unit 13, determine output details (such as display details) using the same criterion as in the output control unit 13, and perform display control of the display.

ID codes may be classified into specific groups. In this case, information indicating the grouping is stored in the storage unit 50 in advance. In this case, the output control unit 13 can determine whether an ID code received from the ID determining unit 11 is classified into the same group as the previously received ID code with reference to the information indicating the grouping which is stored in the storage unit 50. When the ID codes are classified into the same group, the ID codes may be considered to be the same. On the other hand, when the ID codes are classified into different groups, the ID codes may be considered to be different. The ID code may be specific to each RFID tag, but may be an identification for identifying a group, which is allocated to a group of the same kind or similar kind of TFID tags.

Among the elements of the reader device 1, the communication unit 40 and the reception level determining unit 12 are not essential. When the reception level determining unit 12 is not provided, the reader device 1 may not measure the reception level. The output control unit 13 may not determine the blinking rate depending on the reception level. Specifically, the processes of S12 to S13 in FIG. 6*a* and the processes of S23 to S24 and S27 in FIG. 6*b* may not be performed. In this case, the output control unit 13 may turn on the LED 30 at a constant blinking rate or normally.

The LED 30 and the storage unit 50 may be an external device connected to the reader device 1. The LED 30 is installed in the vicinity of the reader device 1 and the RFID tag at the time of performing the installation test of the reader device 1 and is disposed at a position which can be observed by an operator at the time of performing position adjustment of the reader device 1 and the RFID tag.

Second Embodiment

The reader device according to the present disclosure may notify a user that ID codes are different by outputting a sound when interactions succeed continuously and an ID code determined by the ID determining unit 11 is different from an ID code determined in the previous interaction. A second embodiment of the present disclosure will be described below.

The reader device 1 according to this embodiment includes a speaker (a sound output unit) as an output unit in addition to the LED 30. The output control unit 13 controls an output of the speaker in addition to the LED 30. Specifically, when an ID code received from the ID determining unit 11 is different from the ID code received in the previous interaction, the output control unit 13 outputs a sound from the speaker instead of changing the emission color of the LED 30 (or in addition to changing the emission color). The sound output at this time is preferably a warning sound which can be easily recognized by an operator, such as a beep sound.

Figure 7:
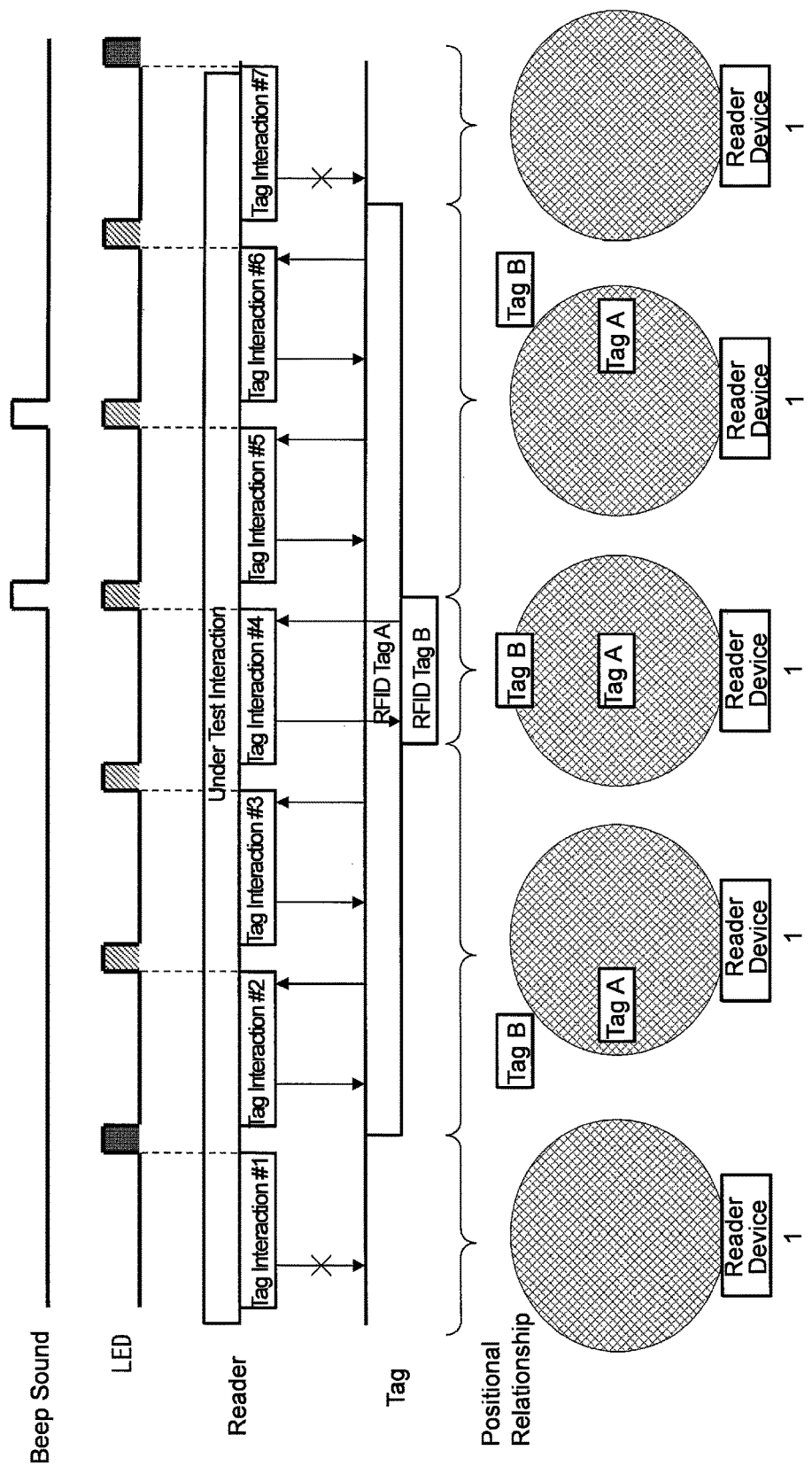
FIG. 7 is a diagram illustrating a relationship between whether an interaction of a reader device succeeds, a change of an RFID tag which is an interaction partner, and a change of a sound output according to a second embodiment of the disclosure.

FIG. 7 is a diagram illustrating a relationship between whether an interaction of the reader device 1 according to the second embodiment succeeds, a change of an RFID tag which is an interaction partner, and a sound output. A "beep" row indicates a time at which the speaker outputs a beep sound. The other rows are the same as illustrated in FIG. 3.

As illustrated in the drawing, when an RFID tag which is an interaction partner is switched from RFID tag A to RFID tag B between Tag interactions #3 and #4, the ID code determined by the ID determining unit 11 is changed. Since the ID code is different from the previous one, the output control unit 13 having been notified of the ID code causes the speaker to output a sound (a beep sound in the illustrated example).

In this way, the reader device 1 according to the second embodiment can give a warning using a sound when the reader device erroneously reads an unwanted RFID tag. Accordingly, even when an operator does not observe the reader device 1, the operator can recognize that an unwanted RFID tag is read.

Third Embodiment

The reader device 1 according to an embodiment of the disclosure may cause the LED 30 to emit light in an emission color corresponding to an ID code. A third embodiment of the present disclosure will be described below.

The storage unit 50 of the reader device 1 according to this embodiment stores information in which an ID code and an emission color of the LED 30 are correlated with each other. When an ID code is received from the ID determining unit 11, the output control unit 13 determines an emission color of the LED 30 with reference to the information in the storage unit 50 and controls the LED 30 such that the LED emits light in the determined color.

Figure 8:
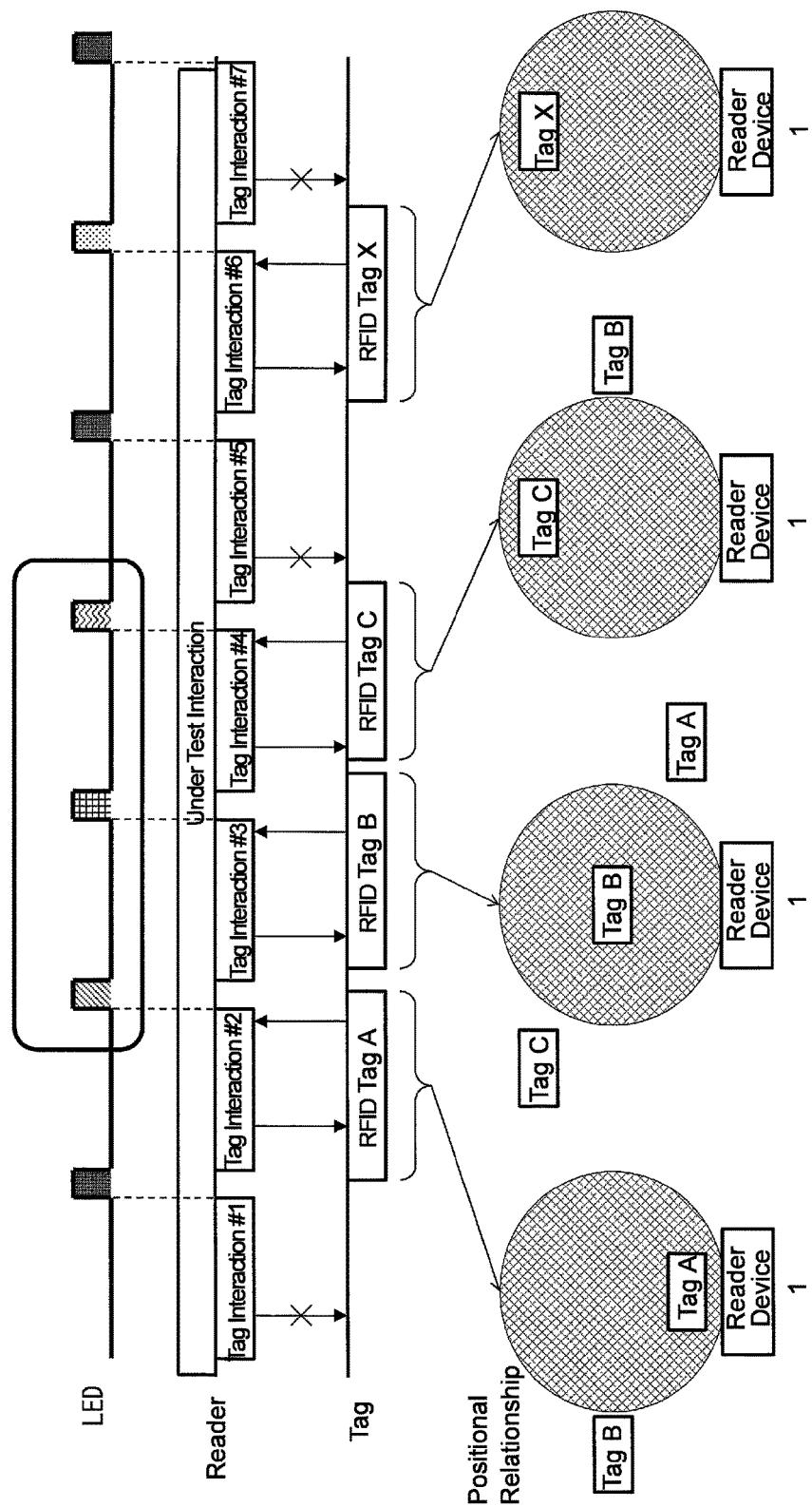
FIG. 8 is a diagram illustrating a relationship between whether an interaction of a reader device succeeds, a change of an RFID tag which is an interaction partner, and a change of an emission color of an LED according to a third embodiment of the disclosure.

FIG. 8 is a diagram illustrating a relationship between whether an interaction of the reader device 1 according to the third embodiment succeeds, a change of an RFID tag which is an interaction partner, and a change of an emission color of the LED 30. The rows are the same as illustrated in FIG. 3. As in the example illustrated in FIG. 8, it is assumed that RFID tags A to C and X interact with the reader device 1 at the illustrated times. In this case, the output control unit 13 of the reader device 1 causes the LED 30 to emit light in an emission color corresponding to the ID code of RFID tag A which is an interaction partner in Tag interaction #2 after Tag interaction #2 ends.

The output control unit 13 causes the LED 30 to emit light in an emission color corresponding to the ID code of RFID tag B which is an interaction partner in Tag interaction #3 after Tag interaction #3 ends. The output control unit 13 causes the LED 30 to emit light in an emission color corresponding to the ID code of RFID tag C which is an interaction partner in Tag interaction #4 after Tag interaction #4 ends. The output control unit 13 causes the LED 30 to emit light in an emission color corresponding to the ID code of RFID tag X which is an interaction partner in Tag interaction #6 after Tag interaction #6 ends. On the other hand, since interactions in Tag interactions #1, #5, and #7 fail, the output control unit 13 causes the LED 30 to emit light in a color indicating the failure of interaction.

In this way, with the reader device 1 according to the third embodiment, an operator can recognize an RFID tag with which the reader device 1 interacts on the basis of the color of the LED 30. Accordingly, the operator can more efficiently perform the installation test of the reader device 1.

Fourth Embodiment

The output control unit 13 of the reader device 1 according to an embodiment of the present disclosure may cause the LED 30 to emit light in different colors when an ID code determined by the ID determining unit 11 is the same as an ID code (a predetermined identification) stored in advance in the storage unit 50 and when the determined ID code is different from the stored ID code. A fourth embodiment of the present disclosure will be described below.

One or more ID codes of the target RFID tag(s) are stored in advance in the storage unit 50 of the reader device 1 according to this embodiment. The reader device 1 acquires information indicating the ID code of the target RFID tag from an external device such as a PC via the communication unit 40 and stores the acquired information in the storage unit 50.

The output control unit 13 reads the ID codes stored in the storage unit 50 when the above-mentioned output control process is performed. Then, when the interaction succeeds, the output control unit 13 determines whether the ID code determined by the ID determining unit 11 is the same as one of the read ID codes. When the determined ID code is the same as one of the read ID codes, the same processes as in the case in which the determination result of S22 in FIG. 6*b* is "the same" are performed. On the other hand, when the ID code determined by the ID determining unit 11 is different from the read ID codes, the same processes as in the case in which the determination result of S22 in FIG. 6b is "different" are performed.

According to the above-mentioned processes, an operator can determine whether the reader device is stably interacting with the RFID tag with a predetermined ID code on the basis of the output of the output unit of the reader device.

Embodiment by Software

The control block of the control unit 10 of the reader device 1 may be embodied by a logic circuit (hardware) formed in an integrated circuit (an IC chip) or may be embodied by software using a central processing unit (CPU).

In the latter, the control unit 10 includes a CPU that executes commands of a program which is software for embodying the functions, a read only memory (ROM) or a storage device (which are referred to as a "recording medium") on which the program and various data are recorded in a manner readable by a computer (or CPU), and a random access memory (RAM) to which the program is loaded. The embodiment of the disclosure is achieved by causing the computer (or the CPU) to read and execute the program from the recording medium. Examples of the recording medium include "non-transitory material mediums" such as a tape, a disk, a card, a semiconductor memory, and a programmable logic circuit. The program may be supplied to the computer via an arbitrary transmission medium (such as a communication network or broadcast waves) that can transmit the program. An embodiment of the disclosure may be embodied in the form of a data signal which has been embedded in carrier waves in which the program is embodied by electronic transmission.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A reader device comprising:
   an interaction unit configured to perform an interaction with an radio frequency identification (RFID) tag at predetermined time intervals using RFID technology;
   an output unit;
   an identification determining unit configured to determine an identification of the RFID tag which is an interaction partner when the interaction succeeds; and
   an output control unit configured to cause the output unit to perform different outputs when the identification determined by the identification determining unit is the same as a predetermined identification previously determined by the identification determining unit and when the identification determined by the identification determining unit is different from the predetermined identification.

2. The reader device according to claim 1, further comprising:
   a storage unit configured to store information indicating the predetermined identification in advance.

3. The reader device according to claim 2, wherein the output unit includes at least one indication lamp, and
   wherein the output control unit causes the at least one indication lamp to emit light in different colors when the identification determined by the identification determining unit is the same as the predetermined identification and when the identification determined by the identification determining unit is different from the predetermined identification.

4. The reader device according to claim 2, wherein the output unit includes a sound output unit, and
   wherein the output control unit causes the sound output unit to output sound when the identification determined by the identification determining unit is different from the predetermined identification.

5. The reader device according to claim 1, wherein the output unit includes at least one indication lamp, and
   wherein the output control unit causes the at least one indication lamp to emit light in different colors when the identification determined by the identification determining unit is the same as the predetermined identification and when the identification determined by the identification determining unit is different from the predetermined identification.

6. The reader device according to claim 5, wherein the output control unit causes the at least one indication lamp to emit light a color corresponding to the identification.

7. The reader device according to claim 6, wherein the output unit includes a sound output unit, and
   wherein the output control unit causes the sound output unit to output sound when the identification determined by the identification determining unit is different from the predetermined identification.

8. The reader device according to claim 5, further comprising:
   a communication strength measuring unit configured to measure a communication strength of the interaction when the interaction succeeds, and
   wherein the output control unit causes the at least one indication lamp to blink at a blinking rate corresponding to the magnitude of the communication strength.

9. The reader device according to claim 8, wherein the output control unit causes the at least one indication lamp to emit light in different colors when the communication strength is less than a predetermined threshold value and when the communication strength is equal to or greater than the predetermined threshold value.

10. The reader device according to claim 9, wherein the output control unit causes the at least one indication lamp to emit light at a blinking rate corresponding to an average value of the communication strengths in a predetermined number of immediately previous interactions in a period in which the identification determining unit specifies the same identification.

11. The reader device according to claim 9, wherein the output unit includes a sound output unit, and
   wherein the output control unit causes the sound output unit to output sound when the identification determined by the identification determining unit is different from the predetermined identification.

12. The reader device according to claim 8, wherein the output control unit causes the at least one indication lamp to emit light at a blinking rate corresponding to an average value of the communication strengths in a predetermined number of immediately previous interactions in a period in which the identification determining unit specifies the same identification.

13. The reader device according to claim 8, wherein the output unit includes a sound output unit, and
   wherein the output control unit causes the sound output unit to output sound when the identification determined by the identification determining unit is different from the predetermined identification.

14. The reader device according to claim 5, wherein the output unit includes a sound output unit, and
wherein the output control unit causes the sound output unit to output sound when the identification determined by the identification determining unit is different from the predetermined identification.

15. The reader device according to claim 1, wherein the output unit includes at least one indication lamp, and
wherein the output control unit causes the at least one indication lamp to emit light in different colors when the identification determined by the identification determining unit is the same as the predetermined identification and when the identification determined by the identification determiningunit is different from the predetermined identification.

16. The reader device according to claim 1, wherein the output unit includes a sound output unit, and
wherein the output control unit causes the sound output unit to output sound when the identification determined by the identification determining unit is different from the predetermined identification.

17. The reader device according to claim 1, wherein the output unit includes a sound output unit, and
wherein the output control unit causes the sound output unit to output sound when the identification determined by the identification determining unit is different from the predetermined identification.

18. The reader device according to claim 6, further co p sing:
a communication strength measuring unit configured to measure a communication strength of the interaction when the interaction succeeds, and
wherein the output control unit causes the at least one indication lamp to blink at a blinking rate corresponding to the magnitude of the communication strength.

19. A control method of a reader device including an interaction unit configured to perform an interaction with an radio frequency identification (RFID) tag at predetermined time intervals using RFID technology and an output unit, the control method comprising:
an identification determining step of determining an identification of the RFID tag which is an interaction partner when the interaction succeeds; and
an output control step of causing the output unit to perform different outputs when the identification determined in the identification determining step is the same as a predetermined identification previously determined by the identification determining step and when the identification determined in the identification determining step is different from the predetermined identification.

* * * * *